Patented Oct. 8, 1929

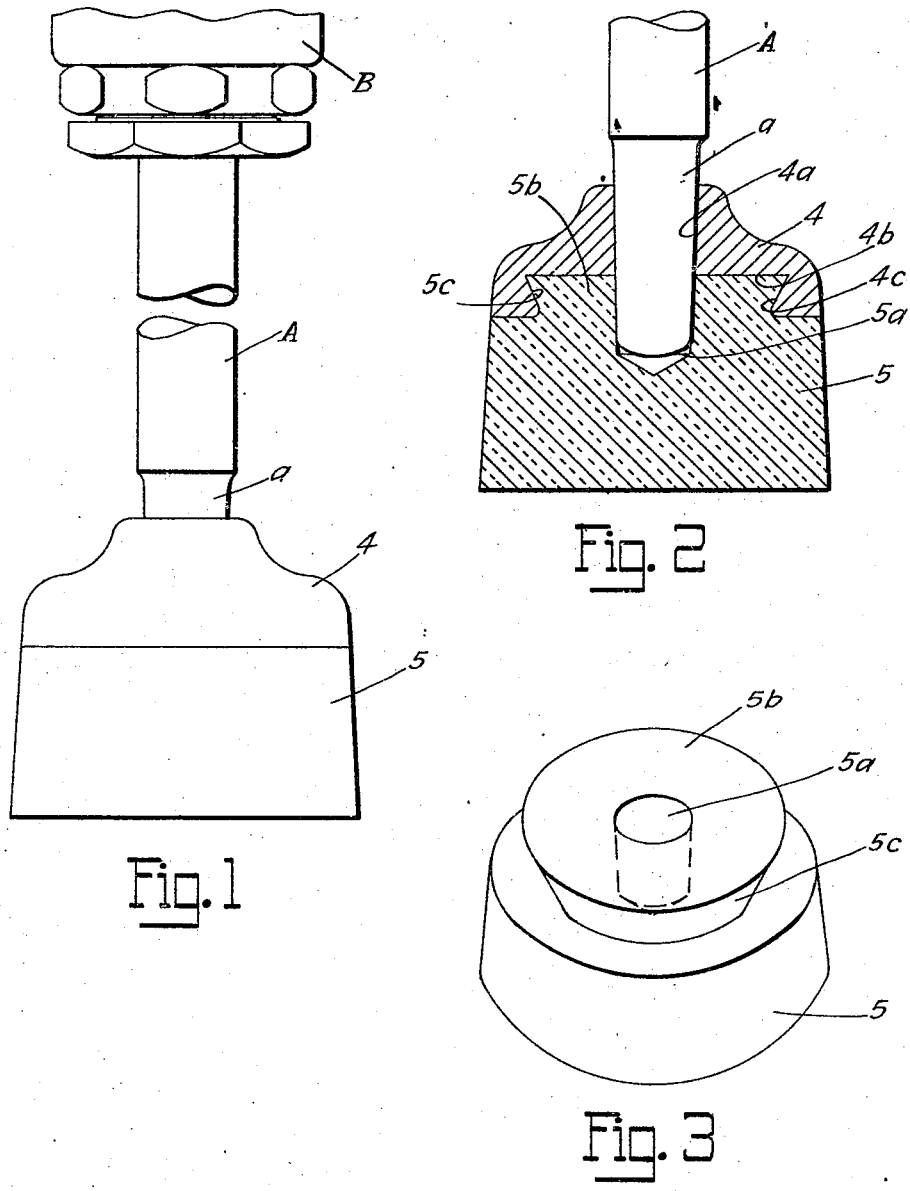

1,730,393

UNITED STATES PATENT OFFICE

EDWARD W. STEVENS, OF DETROIT, MICHIGAN, ASSIGNOR TO CHICAGO PNEUMATIC TOOL COMPANY, OF NEW YORK, N. Y., A CORPORATION OF NEW JERSEY

BUTT FOR SAND RAMMING AND THE LIKE

Application filed August 23, 1927. Serial No. 214,828.

This invention relates to butts for use with ramming tools, as in metal foundry work. More particularly it relates to butts of the resilient type for sand ramming and for all operations in which a reciprocating or other impact blow needs to be cushioned, whether as a protection to the work or to relieve the machine or the operator of at least a portion of the jar of impact. It is equally applicable to manual tools and to power driven machines and tools whether of the stationary or portable type.

Among the objects of the invention are to improve the connection between the butt and the tool shank, to provide a simple and efficient form of butt having a minimum of parts, to provide a more practical method of assembling and interlocking of the component parts, to reduce the cost of production and assembly, and in general to improve prior devices of the described type and to remedy their defects in the interest of better and more satisfactory service.

In order to illustrate the invention one concrete embodiment thereof is shown in the accompanying drawings in which:

Fig. 1 is an elevational view of the rammer butt applied to a tool;

Fig. 2 is a vertical sectional view of the butt showing the manner of its connection to the tool shank;

Fig. 3 is a perspective view of the impact member of the butt.

The improved butt comprises a head 4 and an impact member 5 suitably united together and connected to a tool shank A having a tapered end portion $a$. The shank A may be a part of a manually operated tool or may be arranged to be power driven by any suitable means such as a fluid pressure or pneumatic sand rammer whose cylinder B is partly shown in Fig. 1.

As indicated in Fig. 2 head 4 which is preferably of rigid hard material, such as steel, has a bore $4^a$ therethrough to receive the tapered end $a$ of the tool shank. Impact member 5 which is by preference of resilient material, such as rubber, or rubber compound, has a recess $5^a$ in line with the bore $4^a$ of head 4 also for the purpose of receiving the end of tapered shank $a$. Recess $5^a$ is of less diameter than the end of shank $a$ so that the latter is gripped and held by impact member 5. The connection of the butt may be made still more secure by forming bore $4^a$ so as to have a press fit with tapered shank $a$ thereby securing the shank to both parts of the rammer butt. The extension of shank $a$ into impact member 5 also has an additional function presently to be described.

Head 4 and impact member 5 comprising the improved butt are arranged to be united together in any desired manner. By preference these elements have mating parts. The lower part of head 4 is formed with a recess $4^b$ of any desired shape, but preferably shallow and circular, with undercut sides $4^c$ to form a mortise. The upper end of impact member 5 is provided with a projecting part $5^b$ of a size and shape to conform to the recess $4^b$ and having undercut sides $5^c$ to form a tenon.

With the elements of the butt constructed as above disclosed, the same are assembled together by compressing projection $5^b$ of impact member 5 and forcing it into recess $4^b$ of head 4. When the butt is then forced upon the tapered end $a$ of a tool shank so that the end of the latter projects well down into recess $5^a$, the tenon projection $5^b$ is expanded outwardly with its undercut sides $5^c$ tightly pressed into engagement with the undercut sides $4^c$ of the head so that separation of impact member 5 from head 4 under any conditions of service is quite impossible. In fact the parts cannot be separated without destruction of the undercut engaging portions thereof unless and until the tapered projection $a$ of the tool shank is withdrawn from recess $5^a$.

While a preferred form of the invention has been herein shown and described, it is to be understood that the invention is not to be limited to the specific details thereof, but covers all changes, modifications and adaptations within the scope of the appended claims.

I claim as my invention:

1. The combination with a rammer shank of a butt comprising a head and an impact member, both said head and said member having frictional engagement with said shank.

2. The combination with a rammer shank of a butt comprising a head and an impact member, means detachably uniting said head and member, said head having a bore through which said shank extends and said member having a recess in line with the bore of said head for receiving and gripping the end of said shank.

3. The combination with a rammer shank, of a butt comprising a head and a resilient impact member having interengaging portions detachably uniting the same, said head having a bore through which said shank extends and said member having a recess in line with the bore of said head for receiving and gripping the end of said shank.

4. The combination with a rammer shank of a butt comprising a head and an impact member having mating undercut portions detachably uniting the same, both said head and said member having frictional engagement with said shank.

5. The combination with a tapered rammer shank of a butt comprising a head and a resilient impact member having mating undercut portions detachably uniting the same, said head having a bore therethrough and said member having a recess in line with said bore, said shank extending through said bore and into said recess with a press fit.

6. The combination with a tapered rammer shank of a butt comprising a rigid head having a bore therethrough for said shank and an undercut recess in the lower portion thereof, a resilient impact element having an undercut upper portion to fit the recess in said head and having a recess in line with the bore of said head for receiving and gripping said shank.

7. The combination with a tapered rammer shank of a butt comprising a rigid head having a bore therethrough for receiving said tapered shank with a press fit and an undercut circular recess in the lower part thereof, an elastic impact member having an undercut circular upper portion adapted to be forced into said undercut recess of said head, the upper portion of said member having a recess in line with the bore into which said shank projects to prevent accidental withdrawal of the upper portion of said member from said recess.

8. The combination with a tapered rammer shank of a butt comprising a head having a mortise in its lower portion, a rubber impact member having a tenon on its upper portion to engage the mortise in said head, and means effecting frictional engagement between said shank and said member and preventing separation of said member from said head.

9. The combination with a tapered rammer shank of a butt comprising a head having a mortise on its lower portion, a rubber impact member having a tenon on its upper portion to engage the mortise in said head, and means effecting frictional engagement between said shank and said head and preventing disengagement of said member from said head.

10. The combination with a tapered rammer shank of a butt comprising a head having a mortise on its lower portion, a rubber impact member having a tenon on its upper portion to engage the mortise in said head, and means effecting frictional engagement between said shank and said head and preventing disengagement of said member from said head comprising a bore in said head to provide a press fit for said shank, and a recess in said member adjacent said tenon and in line with said bore.

11. A rammer butt having a head member and a resilient impact member, said members having coacting interengaging parts detachably connecting the same, and means on said members for receiving a rammer shank so that the latter will prevent disengagement of said members.

12. A rammer butt having a head member and a resilient impact member, said members having coacting interengaging parts detachably connecting the same, and means on said impact member for frictional engagement with a rammer shank so as to secure the butt thereto and so that the shank will prevent disengagement of said members.

13. A rammer butt having a head member and a resilient impact member, said members having coacting interengaging parts detachably connecting the same, and means on both said members for receiving and frictionally engaging a rammer shank.

14. A rammer butt having a head member and a resilient impact member, said head member having an undercut recess and said impact member and undercut projection adapted to be forced into said recess to detachably secure said members together, said head member having a bore and said impact member having a recess in line with said bore to receive a rammer shank, said recess being in said undercut projection whereby the rammer shank will prevent separation of said members from withdrawal of said projection from said undercut recess.

Signed by me at Detroit, in the county of Wayne and State of Michigan, this 19 day of August, 1927.

EDWARD W. STEVENS.